United States Patent [19]

Clifton et al.

[11] 4,030,814

[45] June 21, 1977

[54] RECIPE MAGNIFIER AND VIEWER

[76] Inventors: Howard J. Clifton; Doris V. Clifton, both of 32 Garretson Ave., Staten Island, N.Y. 10304

[22] Filed: Dec. 3, 1975

[21] Appl. No.: 637,162

Related U.S. Application Data

[63] Continuation of Ser. No. 485,509, July 3, 1974, abandoned.

[52] U.S. Cl. ............................... 350/238; 350/239
[51] Int. Cl.[2] ......................................... G02B 27/02
[58] Field of Search .......... 350/235, 238, 239, 243, 350/244–246, 250; 266/425; 335/285

[56] References Cited

UNITED STATES PATENTS

| | | | |
|---|---|---|---|
| 1,167,266 | 1/1916 | Bua | 350/238 |
| 1,957,716 | 5/1934 | Koster | 350/239 X |
| 1,989,454 | 1/1935 | Koster | 350/239 X |
| 2,169,786 | 8/1939 | Baum | 350/238 |
| 2,497,332 | 2/1950 | Teetor | 335/285 X |
| 2,876,674 | 3/1959 | Ohlhauer | 350/239 |
| 3,827,020 | 7/1974 | Okamoto | 335/285 |

*Primary Examiner*—Edward S. Bauer
*Assistant Examiner*—F. L. Evans
*Attorney, Agent, or Firm*—Holland, Armstrong, Wilkie & Previto

[57] ABSTRACT

A device for holding, viewing recipes and the like written on cards or other data storing means has a hollow triangular frame, a holder in the front of the frame, a magnifying glass, a stand for holding the data while it is viewed and light means in the frame between the magnifying glass and the stand.

1 Claim, 3 Drawing Figures

RECIPE MAGNIFIER AND VIEWER

This is a continuation of application Ser. No. 485,509 filed July 3, 1974, now abandoned.

BACKGROUND OF THE INVENTION

1. Field of Invention

This invention relates to a device for storing, viewing and magnifying data appearing on cards and the like. The device is particularly intended for use with cooking recipes, and generally whenever set operational procedures are involved.

2. Description of the Prior Art

The prior art to which this invention relates is already aware of the following U.S. Pat. Nos. 2,826,959; 3,052,158; 3,209,648; and 3,212,794. The devices described in those patents include magnifying means but do not comprise holding, storing and magnifying means nor are they designed for the same purpose as the present invention.

The principal object of this invention is to provide a device or article of this character which combines simplicity, strength and durability in a high degree, together with inexpensiveness of construction.

Other objects of this invention will in part be obvious and in part hereinafter pointed out.

The invention accordingly consists in the features of construction, combinations of elements and arrangement of parts which will be exemplified in the construction hereinafter described, and of which the scope of application will be indicated in the following claims.

In the accompanying drawing, in which is shown one of the various possible illustrative embodiments of this invention wherein like reference character identify the same or like parts:

Figure 1:
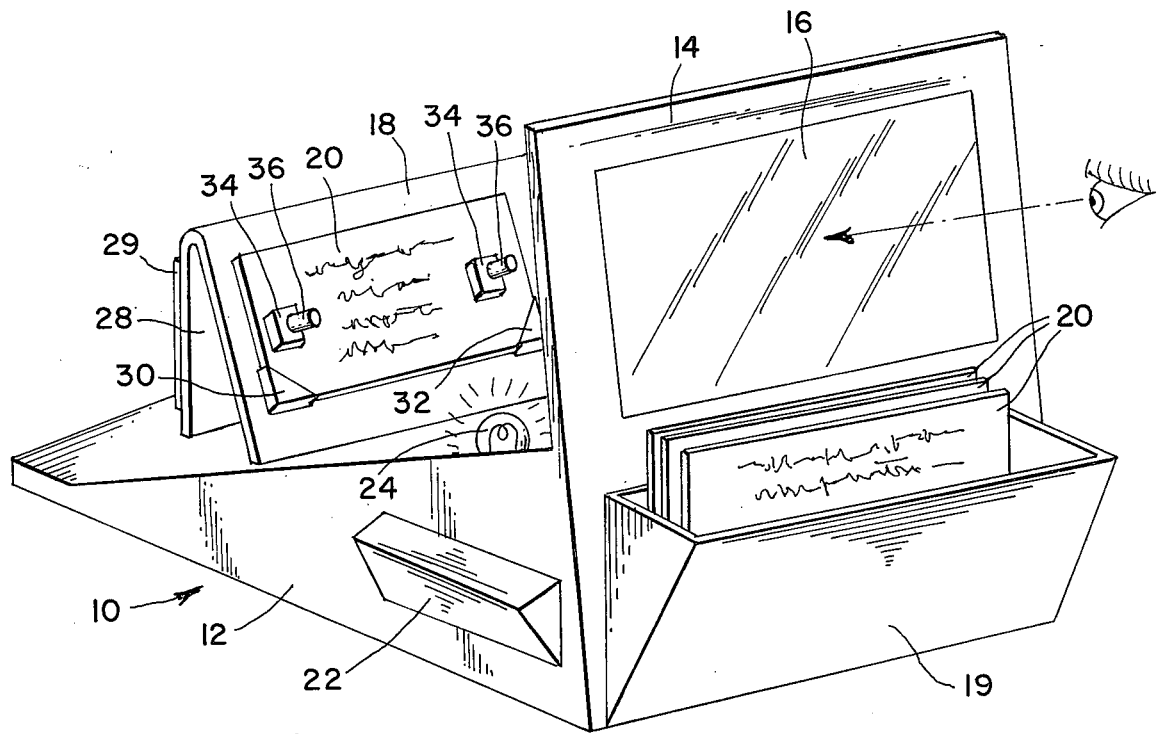
FIG. 1 is a perspective view of the present device.

With reference to the drawing, there is shown and illustrated a viewing and magnifying device constructed in accordance with the principles of the invention and designated generally by reference character 10.

Referring to FIG. 1, the present device includes a generally triangular frame 12, this shape being selected for the purpose of locating the magnifier frame 14 holding glass 16 on a plane higher than that of metal stand 18 which is also triangular in shape. Frame 14 thus is at the apex of the triangle formed by the hollow frame. The front of the partly open-top frame has a rack 19 for recipe cards 20, and carrying handles 22 on each side.

Figure 2:
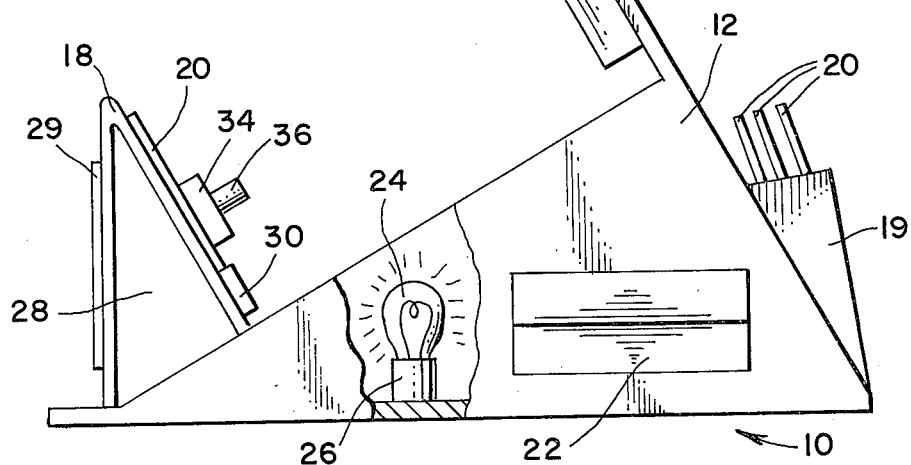
FIG. 2 is a partly cross-sectional view thereof.

As shown, the frame has an open top and houses lighting means such as a bulb 24 mounted in socket 26 of FIG. 2.

Figure 3:
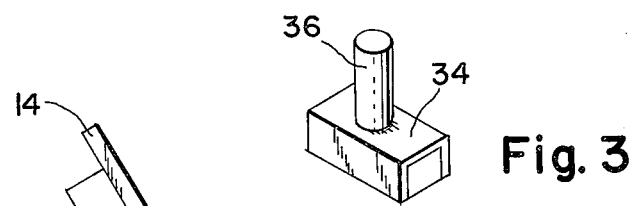
FIG. 3 is a perspective view of a magnet designed for use with the present device.

Metal stand 18 can consist of a sheet of bent metal forming an inner space 28 open on two sides and in which can be stored batteries or a power cord for the light means. For ready reference, a table of weights and measures 29 is fixed on the back of metal stand 18. On the front of the stand are provided a pair of corner flanges 30 and 32 for holding a card 20. To view data material other than that on cards, special magnets 34 are provided. As shown on FIG. 3, the magnets have upwardly extending handles 36 so as to be easily moved on and off the data.

The device may be made in any size desired and can be portable or not.

As will be observed from the drawing, the stand 18 holding the data to be read is on a lower plane than the magnifier 16 to facilitate reading.

With the special holding means 30, 32 and 34, it is easy to grasp and displace the cards 20, or other data not on cards.

As shown, the lighting means are about midway between the magnifier and the data but this distance can be varied.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described our invention we claim as new and desire to secure by Letters Patent:

1. An improved data viewing device comprising in combination:

a frame including a generally horizontal base member with a flat undersurface and having an at least partially opened top;

a magnifier positioned on a support at the front of said base and extending upwardly and rearwardly of said base for enlarging data for a viewer;

a hollow storage rack on said magnifier support below said magnifier and positioned for holding data cards and for exposing top portions of the data cards to a viewer looking toward said magnifier for selection for viewing;

a card stand positioned rearwardly of said magnifier on said base and extending upwardly and rearwardly in a plane generally parallel to that of said magnifier;

means for removably holding an opaque data card on said stand at a lower level than said magnifier; and light means mounted on said frame intermediate said magnifier and said card stand for illuminating said card while held on said stand.

* * * * *